United States Patent
Scherf et al.

(10) Patent No.: US 8,472,289 B2
(45) Date of Patent: Jun. 25, 2013

(54) STATIC TOC INDEXING SYSTEM AND METHOD

(75) Inventors: Steven D. Scherf, Fremont, CA (US); Gary Stroud, Oakland, CA (US)

(73) Assignee: Gracenote, Inc., Emeryville, CA (US)

( * ) Notice: Subject to any disclaimer, the term of this patent is extended or adjusted under 35 U.S.C. 154(b) by 384 days.

(21) Appl. No.: 12/961,470

(22) Filed: Dec. 6, 2010

(65) Prior Publication Data
US 2012/0140605 A1 Jun. 7, 2012

Related U.S. Application Data

(60) Provisional application No. 61/418,508, filed on Dec. 1, 2010.

(51) Int. Cl.
*G11B 21/08* (2006.01)

(52) U.S. Cl.
USPC .................................... 369/30.04; 369/275.3

(58) Field of Classification Search
USPC .......... 369/275.3, 275.2, 275.1, 275.4, 275.5, 369/30.03, 30.04, 30.07, 30.08, 30.09; 428/64.1, 428/64.4; 430/320, 321
See application file for complete search history.

(56) References Cited

U.S. PATENT DOCUMENTS

| | | | |
|---|---|---|---|
| 2004/0027930 A1* | 2/2004 | Kudo | 369/30.05 |
| 2007/0156773 A1* | 7/2007 | Debique et al. | 707/200 |
| 2010/0036841 A1* | 2/2010 | Kudo | 707/5 |

* cited by examiner

*Primary Examiner* — Tan X Dinh
(74) *Attorney, Agent, or Firm* — Schwegman, Lundberg & Woessner, P.A.

(57) ABSTRACT

A method and system is provided for doing compact disc TOC look-ups cheaply and efficiently by using a special indexing mechanism particularized to TOC look-ups. The indexing scheme allows a successful search of TOCs using as few as 2 disk seeks in contrast to the usual hundreds of disk seeks required by a general purpose indexing scheme. This performance improvement is achieved by using a static database of TOCs in a read-only implementation so that the data organization and code for lookups can be optimized without regard for any updates to this data at a later time. The index data structure is arranged in a fashion that allows for seek-less, linear scans of index information once the proper scan location in the index has been identified.

8 Claims, 5 Drawing Sheets

STATIC TOC INDEXING SYSTEM AND METHOD

RELATED APPLICATIONS

This patent application claims the benefit of priority, under 35 U.S.C. §119(e), to U.S. Provisional Application Ser. No. 61/418,508, filed Dec. 1, 2010, which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2009, Gracenote, Inc. All Rights Reserved.

TECHNICAL FIELD

The present disclosure relates generally to music recognition services and more specifically to using novel database indexing methods to store and retrieve information associated with music recognition.

BACKGROUND

Standard audio compact discs ("CD") may not, and normally do not, contain any information related to the content such as artist, track, and title. The only information that is guaranteed to appear on any standard CD is the table of contents ("TOC") which is a "header" at the beginning of each disc. The TOC marks the beginning of each track in frames which are $\frac{1}{75}$th of a second. As such, the CD player can use this information to precisely locate the beginning of each track and to determine the precise track length. For illustrative purposes, a four track CD may contain a TOC composed as follows: [150 26570 49757 72545 94105]. "Track 1" begins at frame 150 (e.g. 2 seconds) and ends at frame 26570 (e.g. approximately 354.25 seconds). "Track 2" begins at frame 26570 and ends at 49757. The last frame, 94105, corresponds to the end of "Track 4" and the end of the CD program area.

Due to the precise nature of TOC frames, the likelihood of two CDs sharing the same TOC is extremely low. As such, a TOC can normally be used to uniquely identify the current CD being played. There are two methods of performing this comparison: exact matching and fuzzy matching. Exact matching requires that all frames from the inputted TOC match the frames of a reference TOC in a database. Fuzzy matching compares the inputted TOC to a subset of reference TOCs in a database and, using an algorithm, determines a correct, or closest, match. Fuzzy matching is particularly useful when exact matches cannot be found. For example, when an album has been reprinted, the TOC of this reproduced album often does not precisely match the TOC of a previously printed album.

Currently, the most common implementation of TOC lookups uses a general-purpose database engine. In many cases, high-end devices utilize a standard B-tree database. This type of database is able to meet the needs of TOC lookups (including fuzzy matches) with the principal advantage being that a general purpose engine can be dynamically updated. However, there are many disadvantages of using such a database structure due to the fixed overhead with regard to code size and performance.

As a consequence of the general-purpose indexing mechanism, a general-purpose database normally requires several disk seeks for each TOC lookup (up to thousands in some cases of fuzzy matching). This is because of the non-linear organization of database information (e.g. TOCs). A standard database normally contains separate "buckets" of information. Both exact and fuzzy matching require sifting through one of more of these buckets, and accessing each bucket requires a database access. Each database access may require a number of disk seeks and significant CPU time to traverse the index. For example, for each bucket the system must navigate through a complex indexing system to locate the address of the bucket, seek to the bucket, and finally scan through the bucket. To search a second bucket, the system must perform the same operation. This can require a substantial amount of seeks which necessitate the use of high-end hardware. On a low-end platform a fuzzy matching operation with a general-purpose indexing scheme could take up to several minutes. As such, these common databases require fast hard disk speeds, extra RAM for caching of data, and significant amounts of CPU processing time.

While this may be acceptable for a high-end hardware platform, implementing such a system and method in a low-end hardware platform would result in extremely poor performance due to limited resources (e.g. RAM and storage space) and low processing power. In many instances, the poor performance renders it unusable. Further, dynamic updates may not be required as part of a low-end solution, which suggests that the general-purpose database engine need not be utilized for TOC lookups in such cases.

In traditional indices, 20-40% of the space consumed by a B-tree index is devoted to the indexing information with the remainder being used to store the actual data itself. The overhead of a B-tree index is variable, and increases as more records are added to the index. Therefore, a variable and substantial portion of storage space is "wasted" on the indexing information rather than on the actual data. In some cases the wasted space can cost many megabytes.

SUMMARY

Example embodiment of an indexing scheme is described herein to make TOC look-ups simple and efficient enough to be employed on a low-end device e.g. a low end car CD player with no hard disk, just flash memory and a 16 bit processor that would be capable of showing basic artist, track and title information with the optional capability to show cover art. It is however to be appreciated that this disclosure is not limited to the aforementioned example embodiments The example Static TOC indexing systems and methods described herein may allow TOC lookups in a manner which more efficiently uses resources such that it may be implemented in a low-end system with performance comparable or superior to a standard B-tree database on a high-end system. For example, the novel indexing scheme may allow a successful search with only two disk seeks as opposed to the usual hundreds of disk seeks for a more general purpose indexing mechanism. Both exact and fuzzy matching of TOCs may, for example, take 2 disk seeks. Once matches have been determined, the additional step of fetching compact disc metadata (such as album/artist/track text) requires only a single disk seek, for a total of three seeks to match a TOC and return metadata for that TOC.

An example deployment includes a called "Static TOC" using a fixed set of TOCs are being utilized in a read-only implementation. The static nature of the lookup makes it possible to enhance (ideally optimize) the data organization and code for lookups without regard for any updates to this data at a later time. Relieved of the need to add new items to the index at a later time, the index data structure can be arranged in an optimal fashion to allow seek-less, linear scans of index information once the proper scan location in the index has been identified.

An example Static TOC indexing system utilizes a simplified indexing system comprising a TOC "lookup table" and "TOC buckets." The TOC lookup table contains two dimensions—the number of tracks on the disc and the total play time of the disc. Each coordinate in the TOC lookup table contains a pointer which references a file offset in the TOC buckets. The TOC buckets can be organized linearly based first upon the number of tracks on an album and second upon the total playtime of an album. Contained within each small bucket (e.g. bucket for 4 track, 2540 seconds) is a complete list of all TOCs for albums with the corresponding number of tracks and total play lengths (e.g. CDs with 4 tracks and a total playtime of 2540 seconds). It should be noted here that the disclosure is not limited to only CDs. The same concept, for example, can be applied to a folder of digital music files from a particular album. The indexing scheme will work so long as the number of tracks and total playing length of the album can be determined from the set of digital media files and the TOC for the album can be easily extracted.

If the TOC buckets are linearly organized, a successful search may be conducted with only two disk seeks—one seek in the lookup table to find the offset referencing the correct TOC bucket to begin searching and a second seek to the determined offset in the bucket—regardless of whether performing an exact match or fuzzy match of TOCs. Once matches have been determined, an additional step of fetching metadata related to the specific media (e.g. album/track/artist for an audio CD) requires only a single disk seek, for a total of three seeks to match a TOC and return metadata for that TOC. Because only three disk seeks may be required to generate a match, the Static TOC indexing system can be easily and efficiently implemented on a low end device.

BRIEF DESCRIPTION OF DRAWINGS

Some embodiments are illustrated by way of example and not limitation in the Figures of the accompanying drawings in which.

DETAILED DESCRIPTION

Example systems and methods for indexing a TOC database are described using an index comprised of a lookup table and bucket file.

The following detailed description refers to the accompanying drawings that depict various details of examples selected to show how the example embodiments may be practiced. The discussion herein addresses various examples of the inventive subject matter at least partially in reference to these drawings, and describes the depicted embodiments in sufficient detail to enable those skilled in the art to practice the embodiments. Many other embodiments may be utilized for practicing the inventive subject matter than the illustrative examples discussed herein, and many structural and operational changes in addition to the alternatives specifically discussed herein may be made without departing from the scope of the inventive subject matter.

Overview

The example systems and methods described herein provide a technique for doing compact disc TOC lookups in a simple and efficient manner. As a result, TOC lookups can be performed on low-end devices to provide a user with information related to the media currently being played (e.g. album/track/title/cover art for an audio CD).

Example Embodiment

Figure 1:
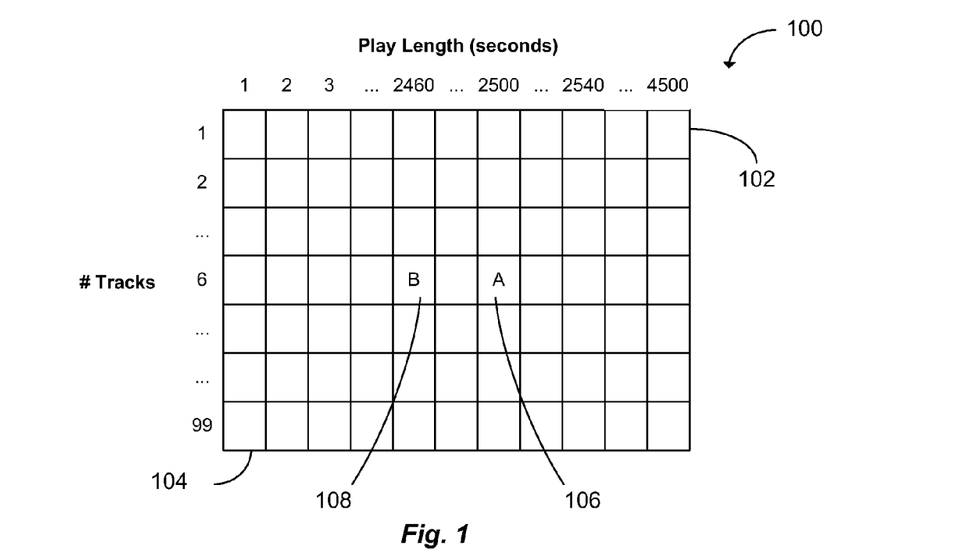
FIG. 1 illustrates a look-up table, in accordance with an example embodiment, configured to be indexed by track count and play length in seconds.
Figure 2A:
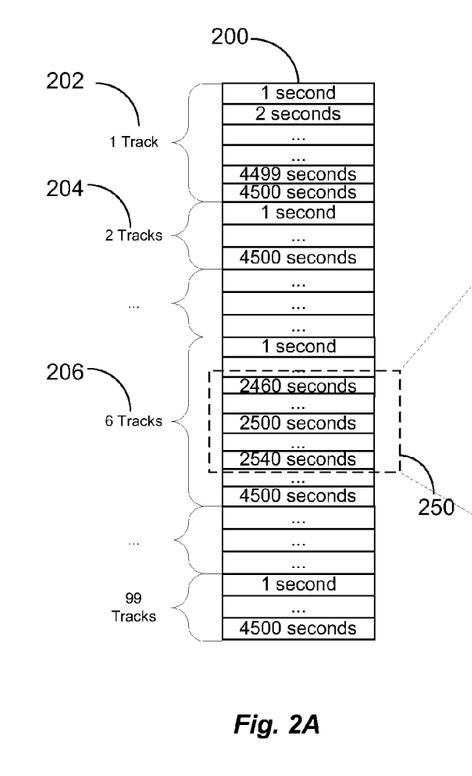
FIG. 2A illustrates a TOC bucket, in accordance with an example embodiment, configured to be ordered into groups based on the total number of tracks on the CD.
Figure 2B:
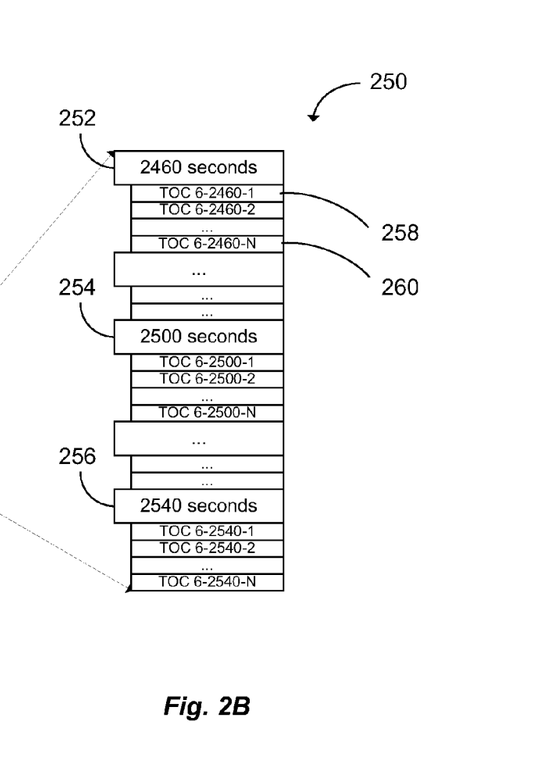
FIG. 2B is a more detailed illustration of a TOC bucket, in accordance with an example embodiment, showing how the TOCs are organized within the TOC bucket.

FIGS. 1, 2A and 2B

The system and method described herein utilizes a two-part indexing system—a lookup table and buckets. In some embodiments, the two parts of the indexing system are contained within a single file. In some embodiments, the two parts of the indexing system may be contained in separate files.

While not limited to CDs, this particular system and method is well suited for CDs because of the nature of their layout and how they are matched. CDs can be categorized by two characteristics—total tracks and total play length. FIG. 1 is an illustration of an example embodiment of the lookup table as applied to CD TOC lookups. In this particular example, the lookup table 100 has been divided by the number of tracks on the CD and the total playtime of the entire CD. Since a CD can have anywhere between one and ninety-nine tracks, the lookup table 100 has been divided into ninety-nine rows 102. Furthermore, in this embodiment, it is assumed that the maximum play length of a CD is 4500 seconds (75 minutes) although CD media beyond 75 minutes of playing time are now available. As such, the lookup table 100 has also been divided into 4500 columns 104. It is convenient to index the look-up table by number of tracks and total playing time because a user will generally want to match discs with the same number of tracks and roughly the same play time. The lookup table 100 is therefore comprised of 445,500 coordinates. Each coordinate within this lookup table 100 contains a reference pointer to an offset within the TOC buckets 200 of FIG. 2A. By indexing these divisions, or "buckets", the work of finding matches in the database is reduced significantly, as you only need to look at buckets of the correct track count and similar play length. The same idea also works for any set of digital media files that belong to a particular album. The number of digital media files provides the track count while the total playing time of the tracks provides the playtime of the entire album.

FIG. 2A is an illustration of an example embodiment of the TOC buckets 200 corresponding to the lookup table 100. The TOC buckets 200 are first ordered into groups (e.g. 202, 204, 206) based upon the total number of tracks on the CD. These basic groups can be organized in linearly ascending orders (e.g. 1 track, 2 track, 3 track, etc.). Within each group, the TOC buckets 200 are then arranged based upon the total play length on the CD (e.g. 1 second, 2 seconds, 3 seconds, etc.). Using this specific organization method, the TOC buckets 200 can be saved in a continuous, read-only file. Other implementations are also possible whereby only some of the buckets are organized in linearly ascending fashion in memory while others are not.

FIG. 2B is a more detailed illustration of a specific segment 250 of FIG. 2A showing the TOCs themselves (e.g. element 258) which are contained within these TOC buckets 200. Within this segment 250 are TOC buckets ranging from element 252 "2460 seconds" through element 256 "2540 seconds" for CDs with a total of 6 tracks. Each TOC bucket may contain a plurality of TOCs which correspond to the play length and number of tracks of the bucket. For example, all TOCs in bucket 252, such as element 258 "TOC 6-2460-1", are TOCs of CDs which have 6 tracks and a total play length of 2460 seconds. Element 260 "TOC 6-2460-N" is the final TOC in bucket 252. Directly following 260 "TOC 6-2460-N" would be "TOC 6-2461-1" (not shown) which is the first TOC for a 6 track CD with total play length of 2461 seconds.

In some embodiments, each TOC, such as 258 "TOC 6-2460-1" contains one or more reference pointers to one or more separate files containing metadata (e.g. artist, track, title, various other album info, cover art, etc.) related to the corresponding album. In other embodiments, the metadata may be contained within the same file.

It should be noted that the example systems and methods described herein contemplates the use of albums with play lengths beyond 4500 seconds. As such, the lookup table need only be modified by adding additional columns as necessary to encompass extended play lengths.

The look-up table 100 is a two-dimensional array of file offsets to TOC buckets 200, indexed by track count and play length in seconds. Locating a particular bucket requires one seek into the look-up table. Within the look-up table is the bucket offset to get to the right bucket within TOC buckets 200. For example 106 and 108 in FIG. 1 are both offsets to the right bucket within TOC buckets 200. Thus, two disk seeks are required—one to jump to the right entry in the look-up table and one to jump to the bucket offset found in the look-up table. When performing an exact match, only one bucket ever needs to be consulted, since potential matches can only reside in one particular bucket for any given TOC. When the correct bucket has been found, a linear scan of that bucket is performed to examine every TOC in the bucket. Thus exact matches only require exactly two disk seeks. Very little CPU power is required, since locating buckets is simply a matter of going to a known location and fetching a single file offset to seek to. This improvement represents approximately one or two orders of magnitude reduction in disk seeks over the aforementioned old method. For example, performing an exact match for a disc with 6 tracks and a play length of 2500 seconds would require seeking to coordinate 106 in look-up table 100, followed by another seek to bucket 254. Once bucket 254 has been found, a linear scan of the bucket is performed to find the exact TOC match. Once the exact TOC match has been found, another disk seek is required to fetch the metadata associated with that TOC.

Fuzzy matching only requires two disk seeks as well. The process of fuzzy matching requires that all TOCs with similar play length must be examined. For example, if a 10 track disc is 2500 seconds, then all 10 track discs that are between 2460 and 2540 seconds in length need to be examined. This would require looking in 81 buckets for matches. In a traditional system, this would mean 81 database operations, each of which might translate to a number of disk seeks. The new system still requires looking in 81 buckets, however, the index is arranged so that the buckets are contiguous in the index file, sorted in ascending fashion according to play length. The system would, therefore, only need to seek to coordinate 108 in look-up table 100 and use the offset from coordinate 108 to seek to bucket 252 in FIG. 2B. Subsequently, all that would be required is a linear scan through the index until bucket 254 (corresponding to 2540 second discs) is reached. This is one of more dramatic advantages of this new system, as it reduces the fuzzy matching disk seek requirements by two or three orders of magnitude over a traditional index. In the event that not all buckets are arranged contiguously, then along with the offset to the starting bucket, the look-up table also needs to store the size of the bucket it addresses. This allows the system to know when it has reached the end of a bucket and needs to seek to the start of a new bucket.

Since an exact matching operation in this scheme is essentially identical to fuzzy matching, both exact matching and fuzzy matching can be done in a single operation. When fuzzy matching takes place, the single "exact match bucket" is examined as part of the operation. As fuzzy matching is under way, if an exact match is encountered, processing can stop and the exact match returned in lieu of any fuzzy matches found up to that point. This avoids having to do the four seeks for both the exact and fuzzy matching operation (if the exact match fails).

Therefore, in certain embodiments it may be advantageous to not have different seeking methods for exact and fuzzy matches. Every search can proceed as a fuzzy match. However, this is only of benefit when the sum total size of all the buckets to be examined in the fuzzy matching operation is relatively small, so that simply doing both operations at the same time would take less time than the additional two seeks that are avoided by doing it this way. The decision can be made conditionally by determining the bucket sizes (inexpensively) before proceeding, simply by looking at the start offset of the first bucket and end offset of the last bucket in the look-up table. For example, when searching a disc with 6 tracks and 2502 seconds of playing time, the system could determine how large the buckets are between coordinate 106 and 108. If the bucket sizes are under some threshold value, the system could simply proceed with a fuzzy match operation as opposed to an exact match. This way the added cost of proceeding first with an exact match and then doing separate disk seeks for the fuzzy match is avoided. Again, this embodiment assumes that the buckets are contiguous. For implementations where not all the buckets are contiguous, certain extra operations will needed to be performed in order to determine whether it's more expensive to proceed seeking using a fuzzy or exact matching technique.

Operation

Figure 3A:
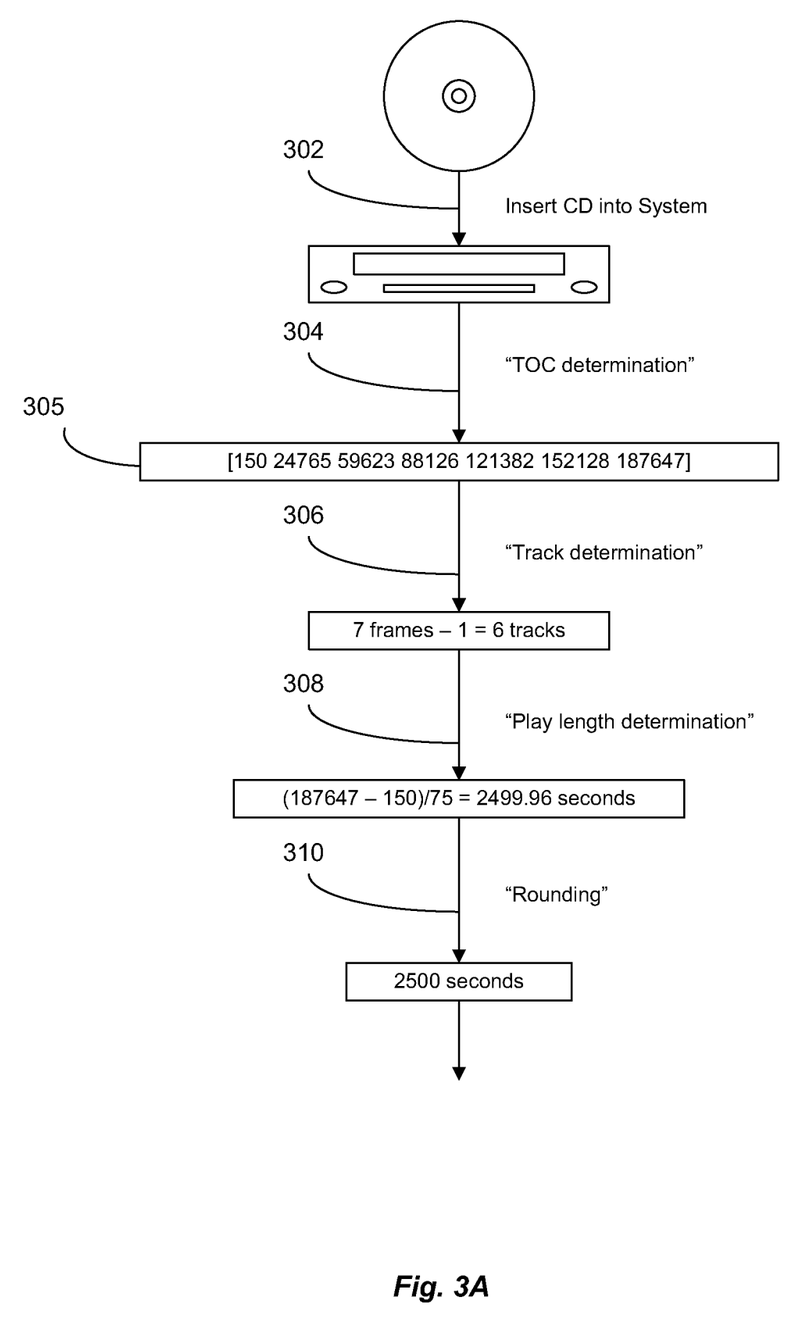
FIG. 3A is a flow diagram of a method, in accordance with an example embodiment, of determining the number of tracks and total play length of a CD.
Figure 3B:
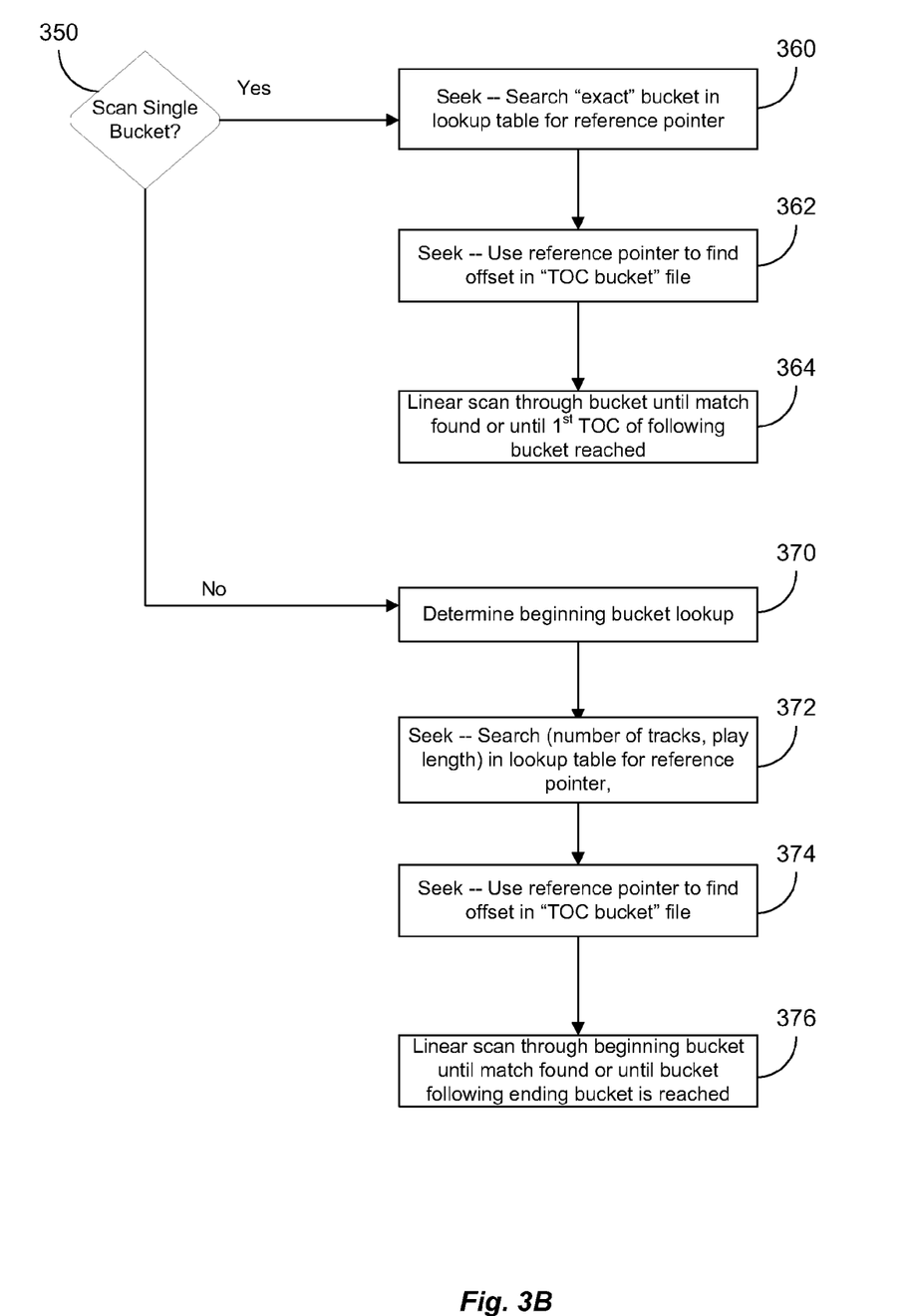
FIG. 3B illustrates a flow diagram of a method, in accordance with an example embodiment, of making an exact or fuzzy match for the CD TOC.

FIGS. 3A and 3B

FIG. 3A is an illustration of an embodiment of the first portion of the method—determining the number of tracks and total play length of a CD. During the first step, 302, a CD is inputted into the system. During the "TOC determination" step 304, the system reads the TOC information contained on the CD. An example TOC 305 is illustrated in the figure. Afterwards, during the "track determination" step 306, the system determines the total number of tracks contained on the CD by subtracting one from the total number of frames in the TOC. In the example TOC, there are 7 frames and therefore 6 tracks on the CD itself. During the "play length determination" step, the system then calculates the total play length of the CD by simply subtracting the first frame of the TOC from the last frame of the TOC and dividing by 75. In the illustrated example, the play length is 2499.96 seconds. Finally, during the "rounding" step 310, any method of converting the number to an integer value is appropriate so long as it is consistently applied between the system and the indexing method. It should be noted that the "track determination" step 306 and "play length determination" step 308 need not be completed in this particular order. They may be performed in opposite order or concurrently.

FIG. 3B shows an embodiment of the second portion of the method corresponding to FIG. 3A. Once the total play length and the number of tracks of a CD have been determined by the system, the system must then determine whether to scan a single bucket at 350. In some embodiments, a user may choose to perform exact matching only. Since an exact match requires that the frames of the TOC of the inputted CD precisely match all frames of a reference TOC found in the database, the system would only need to scan a single bucket. In some embodiments, the system may be configured such that it only performs exact matches.

If the system opts to scan only a single bucket, what follows is a three step process. During the first seek 360, the system searches for the coordinate (number of tracks, total play length) in the lookup table to determine the reference pointer. For example, the system will seek to "A" 106 of the lookup table 100. As described above with reference to FIG. 1, this reference pointer will point to the file offset of "TOC buckets". During the second seek 362, the system uses the reference pointer to seek to the correct file offset within the "TOC buckets" file. In the example scenario, the system will seek to the "2500 seconds" bucket 254. Depending on the embodiment, during the final step 364, the system linearly scans through the entire bucket until it either (a) reaches a TOC which is an exact match (where there are multiple exact matches, the system would proceed to the last matching TOC in the bucket) or (b) reaches the end of the range. In the case where there are multiple identical TOCs, the system would know to stop after the last matching one because typically the TOCs in the index would be arranged contiguously. Where the TOCs are not arranged contiguously, the system would have to scan to the end of the range to ensure that all identical TOCs have been collected.

As will be made apparent to those particularly skilled in the art, in some embodiments, the system will not scan a single bucket as the system resource and processing requirements remain minimal when scanning multiple buckets ("wide-range scan"). For example a fuzzy matching technique would necessitate a wide-range scan. In such cases an exact match of a TOC cannot be found due to minor variances in TOCs (e.g. due to reprinting of a CD). Fuzzy matching can compare a TOC to multiple reference TOCs in a database and, using an algorithm, determine the correct match. Or it may be, as mentioned previously, that in some cases the system may be configured to perform both exact and fuzzy matching as one single operation if the bucket sizes are under some predetermined threshold value.

If the system scans through multiple buckets, what follows is a four-step process. In the first step 370, the system determines the correct coordinate in the look-up table to get the bucket offset address from. Referring back to the previous example (6 track CD with a total play length of 2500 seconds), the system may be configured to scan a range of +/−40 seconds (2460 seconds through 2540 seconds). During the first seek 372, the system would seek to the first bucket in this range ("beginning" bucket, e.g. "B" 108 in the lookup table 100) to determine the reference pointer. During the second seek 374, the system uses this reference pointer to seek to the correct file offset within the "TOC buckets" file. In the example, the system will seek to the "2460 seconds" bucket 252. During the final step 376, the system will linearly scan through the entire range of buckets until it either (a) reaches a TOC which is an exact match (where there are multiple exact matches, the system would proceed to the last matching TOC in the bucket), or (c) reaches the end of the range.

As such, performing fuzzy matching also only requires two seeks and a linear scan. As mentioned previously, in certain other embodiments where the buckets are not contiguously arranged, certain extra calculations and seeks may be required.

Automatic Determination of Single-Bucket Scan

Figure 4:
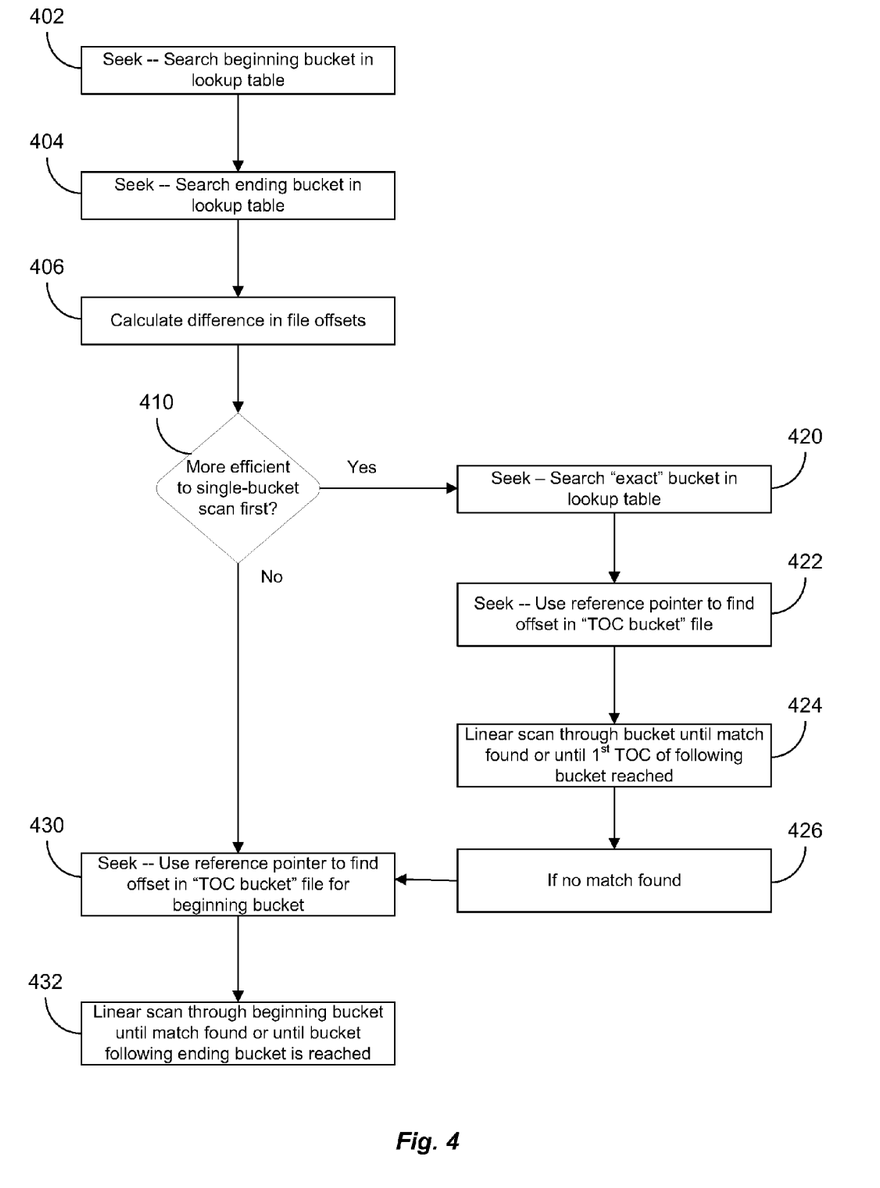
FIG. 4 illustrates a flow diagram of a method, in accordance with an example embodiment, of determining whether to follow an exact-matching or a fuzzy matching procedure.

FIG. 4

Due to the requirement of only two seeks for either a single-bucket scan or a wide-range scan, it may be that doing a wide-range scan for even an exact match may be more efficient than doing 2 seeks for an exact match followed by 2 additional seeks for a fuzzy match in the event no exact match is found. In many cases, performing exact matching prior to performing fuzzy matching may be unnecessary. Therefore, in some embodiments, exact matching is performed during the fuzzy matching process. As was explained above with reference to FIG. 3B, a wide-range scan completes if an exact match is found.

However, in certain circumstances (e.g. the size of the range of buckets is large), it may be beneficial to perform exact matching prior to fuzzy matching. In some embodiments, the system may dynamically determine whether to perform a single-bucket scan prior to performing a wide-range scan. FIG. 4 is an illustration of an example embodiment which dynamically determines whether exact matching should be performed prior to fuzzy matching.

In FIG. 4, the system has already determined the total play length of the CD, the number of tracks on the CD, and the first bucket to locate in the lookup table based upon the wide-range scan parameters. During the first seek 402, the system searches the lookup table for the beginning bucket of the wide-range scan (e.g. "6 track, 2460 seconds") to determine the first file offset. During the second seek 404, the system searches the lookup table for the bucket following the last bucket of the wide range scan (e.g. last bucket is "2540 seconds", therefore seek "2541 seconds"). During the "file offset calculation" step 406, the system uses the file offsets (gathered from reference pointers) and calculates the difference. Through an algorithm 410, the system determines whether it is more efficient to perform a single-bucket scan prior to a wide-range scan.

If a single-bucket scan is performed first, the system follows a procedure similar to 360, 362, and 364 of FIG. 3B. During step 420, the system performs a third seek and searches for the single-bucket (the "exact" bucket) in the lookup table to locate the reference pointer. Afterwards, during the following step 422, the system performs a fourth seek to the file offset within the "TOC bucket" file. During the linear scan step 424, the system linearly scans through the entire bucket until it either a) reaches a TOC which is an exact match or (c) reaches the end of the range.

If no exact match is found 426, the system then moves to step 430. During step 430, the system seeks to the file offset in the "TOC bucket" file to locate the "beginning" bucket of the wide-range scan. During the final step 432, the system linearly scans through the entire range of buckets until it either (a) reaches a TOC which is an exact match, or (c) reaches the end of the range.

If the system determines that a single-bucket scan should not be performed, the system bypasses steps 420 through 426.

Metadata Display

The album metadata associated with the static TOC index can be stored in either the same or different files. For example, the static TOC index can be associated with the album metadata stored in other static flat data files, by storing the offset of the album data in the static TOC index. When a TOC is matched, the record may contain one or more offsets into one or more associated metadata files. To fetch the metadata for a match only requires a single disk seek to the indicated location in the metadata file. This avoids yet another b-tree database access, as would be required in a more traditional implementation.

Also, in addition to the TOC metadata database with all the recognition information, one can associate with it any number of static separately indexed databases which will hold other information such as metadata, cover art etc. The TOC table can be a single flat file (or multiple flat files) containing file offsets that specify which address to jump to in, for example, the metadata table. This is why multiple disk accesses are not required because the exact location will be specified in the TOC table. One would not have to traverse trees as in standard database implementations.

TOC Hash Table

Matching using the Static TOC index can further be sped up by the addition of a TOC hash table. By hashing the TOCs (using the MD5 message digest algorithm, for example), and indexing them in a similar static index, each individual bucket is smaller, on the average. This is because a good hashing algorithm provides a more uniform distribution than the raw TOCs alone. Matches still require only two seeks, but the bucket sizes will be smaller, requiring less linear scanning of buckets on the disk (and fewer comparisons, leading to reduced CPU consumption).

Updates

Due to the read-only nature of the static TOC files (lookup tables and buckets), the static TOC files themselves are not directly updated as doing so would disrupt the organization of the file itself. For ad-hoc updates, e.g. new records perhaps hand-entered by the end user or fetched from some external online source, etc., instead of adding it to this "pre-cooked" static array of TOC values, one would simply add a second b-tree database with the updates. A user is unlikely to ever add more than a couple hundred ad-hoc CD updates, which is a small enough number such that keeping this information in a separate b-tree database to do a quick local look up before trying the embedded database would not be very costly (because of the b-tree's small size, less seeks will be required, and each seek is likely to be a short one due to the locality of disk blocks in the small database). For large, pre-built database updates, a second static TOC index would be added containing only updated information. Since the original pre-cooked table would only require 2 disk seeks to find a match, it would not be very expensive from a processing standpoint to add an additional table where you could also use up 2 disk seeks to find a match. Lookups would require searching both indexes, but would still require only 2 seeks per index (for a total of 4). One would have to get upwards of 150 disk seeks or more to approach the slowness of the current look-up algorithm. Thus, 74 additional static TOC indexes would have to be added before the system approaches the slowness of the current lookup algorithm. Presumably, large pre-built updates would be infrequent (on the order of several months apart), thus making it unlikely that lookups would ever get too slow over the life of the product. An alternate approach would be to always replace the entire static TOC index with each update, or to always replace the last update with a single updated index containing all cumulative changes since the original static TOC index was created; these two alternate approaches ensure that there are never more than two static TOC indices, regardless of the number of updates.

Compression of Index

As discussed previously, one possible additional benefit of the example embodiments may be that the new system is more compact than a traditional index e.g. b-tree index. An additional benefit of the new system is that it is more compact than a traditional index (such as a b-tree index). The overhead of a b-tree index is variable, and increases as more records are added to the index. Typically, 20-40% of the space consumed by a b-tree index is devoted to indexing information, with the remainder being used to store the actual data itself. This represents a large amount of "wasted" storage space. The overhead of the static TOC index is fixed at 445,500 values, or about 1.7 megabytes, regardless of how many records are stored in the index. This represents about 4.25% for an index of average size (about 40 megabytes), and even less for a larger index.

The index size can be further reduced by storing the TOCs in a special compressed format. Standard compression methods do not result in appreciable size reduction, because of their seemingly random nature. Random patterns confound traditional compression algorithms such as Huffman coding or Lempel-Ziv compression. To be effective, a TOC compression algorithm must be designed specifically for the task of compressing CD TOCs, based on knowledge of TOC offset frequencies; it must also be usable for matching in compressed form, to avoid the expensive task of decompressing each TOC being compared before matching can take place. TOC offsets are simply numbers representing the offset of each song on a compact disc, in frames of 75ths of a second. By subtracting adjacent offsets, the length of each song on the disc can be determined. Because the vast majority of songs are much shorter than about 7 minutes (32768 frames), most of the offsets can be stored as 15 bit integer (with the 16th bit used as a flag indicating the more rare case when a song is longer than 32768 frames). This allows storing most TOC offsets as 2-byte integers, instead of the 4 normally required to store offsets, effectively cutting the size of the TOC index in half (aside from the hash table overhead). Furthermore, because this compression method keeps the offsets in integer form, TOCs can be compared without having to decompress them first—they can be compared to each other directly in compressed form.

Figure 5:
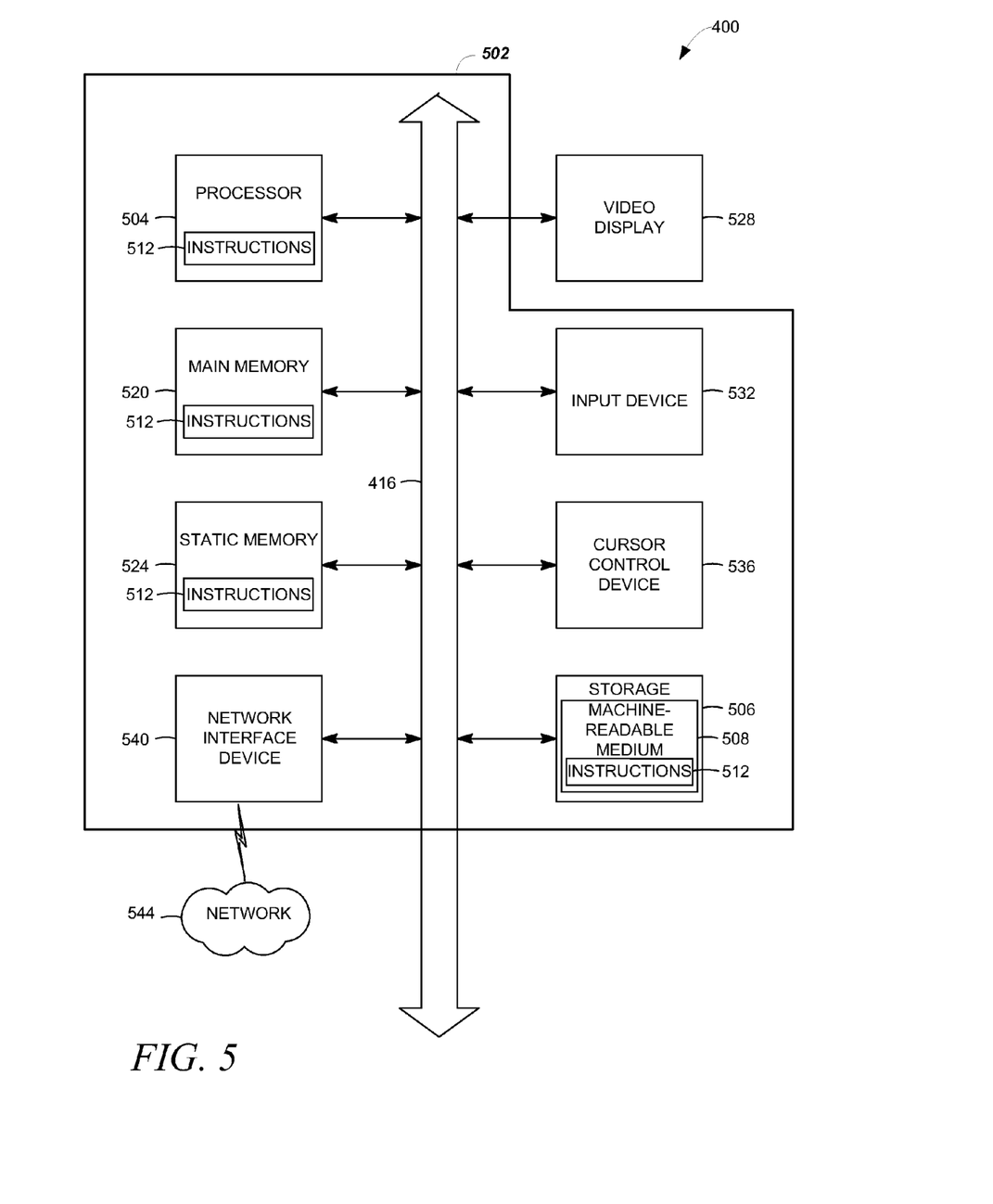
FIG. 5 illustrates an example computer system which may perform one or more of the methodologies described herein.

FIG. 5 is a block diagram of an article 500 of manufacture, including a specific machine 502, according to various example embodiments. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 500 of manufacture, such as a computer, a memory system, a magnetic or optical disk, some other storage device, and/or any type of electronic device or system may include one or more processors 504 coupled to a machine-readable medium 508 such as a memory (e.g., removable storage media, as well as any memory including an electrical, optical, or electromagnetic conductor) having instructions 512 stored thereon (e.g., computer program instructions), which when executed by the one or more processors 504 result in the machine 502 performing any of the actions described with respect to the methods above.

The machine 502 may take the form of a specific computer system (e.g., a vehicle audio system, a portable media player, or the like) having a processor 504 coupled to a number of components directly, and/or using a bus 516. Thus, the machine 502 may perform any one or more of the methods described herein and define a system as herein described.

Turning now to FIG. 5, it can be seen that the components of the machine 502 may include main memory 520, static or non-volatile memory 524, and mass storage 506. Other components coupled to the processor 504 may include an input device 532, such as a keyboard, or a cursor control device 536, such as a mouse. An output device 528, such as a video display, may be located apart from the machine 502 (as shown), or made as an integral part of the machine 502.

A network interface device 540 to couple the processor 504 and other components to a network 544 may also be coupled to the bus 516. The instructions 512 may be transmitted or received over the network 544 via the network interface device 540 utilizing any one of a number of well-known transfer protocols (e.g., HyperText Transfer Protocol). Any of these elements coupled to the bus 516 may be absent, present singly, or present in plural numbers, depending on the specific embodiment to be realized.

The processor 504, the memories 520, 524, and the storage device 506 may each include instructions 512 which, when executed, cause the machine 502 to perform any one or more of the methods described herein. In some embodiments, the machine 502 operates as a standalone device or may be connected (e.g., networked) to other machines. In a networked environment, the machine 502 may operate in the capacity of a server or a client machine in server-client network environment, or as a peer machine in a peer-to-peer (or distributed) network environment.

The machine 502 may comprise a personal computer (PC), audios system (e.g., a vehicle audio system, portable media player, etc) a tablet PC, a set-top box (STB), a PDA, a cellular telephone, a web appliance, server, client, or any specific machine capable of executing a set of instructions (sequential or otherwise) that direct actions to be taken by that machine to implement the methods and functions described herein. Further, while only a single machine 502 is illustrated, the term "machine" shall also be taken to include any collection of machines that individually or jointly execute a set (or multiple sets) of instructions to perform any one or more of the methodologies discussed herein.

While the machine-readable medium 508 is shown as a single medium, the term "machine-readable medium" should be taken to include a single medium or multiple media (e.g., a centralized or distributed database, and/or associated caches and servers, and or a variety of storage media, such as the registers of the processor 504, memories 520, 524, and the storage device 506 that store the one or more sets of instructions 512. The term "machine-readable medium" shall also be taken to include any medium that is capable of storing, encoding or carrying a set of instructions for execution by the machine and that cause the machine 502 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a standalone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to provide improved resource management, by prioritizing requests and taking advantage of associated cloud computing architectures. Increased project management efficiency, more immediate response to customer service issues, and increased user satisfaction may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method of finding a match for a reference TOC comprising:
   using one or more processors to perform operations of:
   organizing a TOC database into a look-up table and buckets,
   wherein the lookup tables are divided into the number of tracks in a set and the total playtime of the set,
   and wherein each bucket comprises a linear table of TOCs organized by number of tracks in the set, and further where at least two of the buckets are arranged contiguously;
   identifying the start of a bucket range containing the matching TOC using two seeks, wherein the first seek identifies a coordinate in the look-up table and retrieves a pointer from the coordinate, and the second seek uses the pointer to identify the start of the bucket range; and
   scanning the bucket range to find a match for the reference TOC.

2. The method of claim 1, wherein all buckets are organized in a linear fashion in ascending or descending order.

3. The method of claim 2, wherein the bucket range consists of multiple buckets.

4. The method of claim 2, wherein all buckets reside in memory.

5. The method of claim 1, further comprising retrieving metadata, cover-art or any other data related to music files associated with the reference TOC after finding a match in the bucket range.

6. The method of claim 5, further comprising hashing the TOCs and storing them in a separate hash table.

7. The method of claim 1, further comprising storing updates in a second database that is distinct from the TOC database.

8. The method of claim 1, wherein the offset values contained in the TOC in the bucket are stored as 15 or fewer bit integers.

* * * * *

UNITED STATES PATENT AND TRADEMARK OFFICE
CERTIFICATE OF CORRECTION

PATENT NO. : 8,472,289 B2  
APPLICATION NO. : 12/961470  
DATED : June 25, 2013  
INVENTOR(S) : Scherf et al.

It is certified that error appears in the above-identified patent and that said Letters Patent is hereby corrected as shown below:

In the Drawings

Sheet 3 of 5, Fig. 3B, reference numeral 372, line 3, delete "pointer," and insert --pointer--, therefor On sheet 5 of 5, Fig. 5, reference numeral 416, line 1, delete "416" and insert --516--, therefor In the Specification

In column 2, line 12, delete "of" and insert --or--, therefor (first occurrence)

In column 2, line 53, delete "embodiments" and insert --embodiments.--, therefor In column 12, line 2, delete "audios" and insert --audio--, therefor In column 12, line 3, delete "etc" and insert --etc.--, therefor Signed and Sealed this  
Twenty-sixth Day of November, 2013

Margaret A. Focarino  
*Commissioner for Patents of the United States Patent and Trademark Office*